US 6,665,670 B2

(12) United States Patent
Winer et al.

(10) Patent No.: US 6,665,670 B2
(45) Date of Patent: Dec. 16, 2003

(54) METHOD AND SYSTEM FOR GRAPHICAL REPRESENTATION OF MULTITEMPORAL, MULTIDIMENSIONAL DATA RELATIONSHIPS

(75) Inventors: David S. Winer, Charlottesville, VA (US); David E. Martin, Charlottesville, VA (US); Jason O. Watson, Keswick, VA (US); David J. Pratt, Charlottesville, VA (US)

(73) Assignee: M.CAM, Inc., Charlottesville, VA (US)

( * ) Notice: Subject to any disclaimer, the term of this patent is extended or adjusted under 35 U.S.C. 154(b) by 370 days.

(21) Appl. No.: 09/822,445

(22) Filed: Mar. 30, 2001

(65) Prior Publication Data

US 2002/0174131 A1 Nov. 21, 2002

(51) Int. Cl.⁷ .............................................. G06F 17/30
(52) U.S. Cl. .............................. 707/6; 707/10; 707/102; 707/104.1
(58) Field of Search .................... 707/1–10, 100–104.1, 707/200–206; 713/156

(56) References Cited

U.S. PATENT DOCUMENTS

| 5,721,900 | A | 2/1998 | Banning et al. |
| 5,721,910 | A | 2/1998 | Unger et al. |
| 5,991,751 | A | 11/1999 | Rivette et al. |
| 5,991,780 | A | 11/1999 | Rivette et al. |
| 6,038,561 | A | 3/2000 | Snyder et al. |
| 6,041,331 | A | 3/2000 | Weiner et al. |
| 6,094,650 | A | 7/2000 | Stoffel et al. |
| 6,175,824 | B1 | 1/2001 | Breitzman et al. |

*Primary Examiner*—Shahid Alam
*Assistant Examiner*—Jean Bolte Fleurantin
(74) *Attorney, Agent, or Firm*—Peter E. Rosden

(57) ABSTRACT

A method and system for determining the likely uniqueness and novelty of a subject concept, such as a patent, in comparison with other published references embodying other concepts by examining the subject concept in the context of references published both before and after the subject concept looking for instances in which a particular other published reference can be determined to be an ancestor of or progeny of the subject concept and then constructing and displaying a morphogenetic icon for representing such multi-dimensional, multi-temporal relationships in a two-dimensional manner.

6 Claims, 5 Drawing Sheets

FIG. 5

| Patent | Assignee | Classification | Icon | Patent Ratio / Citation Ratio | Filed / Issued | PDF |
|---|---|---|---|---|---|---|
| 4186984 | AMP Incorporated | 339 | | 84/500 / 112/558 | 05-MAY-78 / 05-FEB-80 | ☐ |
| 4508415 | AMP Incorporated | 339 | | 84/500 / 112/558 | 29-JUL-83 / 02-APR-85 | ☐ |
| 4582376 | AMP Incorporated | 339 | | 84/500 / 112/558 | 09-APR-84 / 15-APR-86 | ☐ |
| 4682836 | Thomas & Betts Corporation | 439 ELECTRICAL CONNECTORS | | 16/500 / 29/558 | 07-OCT-85 / 28-JUL-87 | ☐ |

US 6,665,670 B2

METHOD AND SYSTEM FOR GRAPHICAL REPRESENTATION OF MULTITEMPORAL, MULTIDIMENSIONAL DATA RELATIONSHIPS

TECHNICAL FIELD

The subject invention relates generally to an interactive, computer-based method and system for generating and displaying an icon representing the relationships between a given concept and other concepts both pre-dating and post-dating the original concept, and, more particularly, to a method and system for generating and displaying such a relationship between a subject patent reference and other patent references pre-dating and post-dating the subject patent reference.

BACKGROUND OF THE INVENTION

In an effort to rapidly quantify and identify novelty and uniqueness of data which has intrinsic elements requiring differentiation between historical and present iterations, numerous efforts have been made to graphically represent data generated sequentially in time. For example, word-processing technology has long provided users the ability to compare subsequent versions of documents with earlier versions by identifying and setting off changes made at different times by different persons.

In the field of intellectual property, software to characterize intangible property claims and to provide genealogically based presentations based on references embedded within existing documents have been developed and deployed by various parties.

However, no systematic process has been established to graphically represent multidimensional, multitemporal data relationships in a two-dimensional form or multi-iteration data so that the "position" of data with respect to its uniqueness or stage of iteration can be simultaneously sorted and used as a database archival-retrieval address for aggregating and presenting the data in multiple formats or lists. Furthermore, no system has been developed to quickly and efficiently generate and display in a single, simple, uniform graphic depiction the relevance and interrelatedness of patents and concepts to a specified patent or concept both preceding and following a specified patent or concept in time.

Another problem in analyzing multiple generations of prior and subsequent history for one patent or concept in relation to another is that fully displaying such information in a hierarchical fashion, such as a tree, quickly occupies too much display space, requiring paging through multiple displays, and looses its informational value due to the volume of data being presented. It is difficult to limit the amount of information being displayed and visible at one time on one display surface while still making the information which is actually displayed both relevant and meaningful. What was required was a translatable symbolic representation which would reduce multirelational, multitemporal, multidimensional information to a simple, easily understood two dimensional model.

SUMMARY OF THE INVENTION

The present invention relates to a computer-implemented system and method for determining and visually representing in an easily comprehensible fashion the likely uniqueness and novelty of a subject concept, which may have been published in a reference or not, as compared to other concepts, each of which has been published in a reference, where the other concepts were published on various dates, some of which may have preceded the date of the subject concept and some of which may be subsequent to that of the subject concept. A permanent computer database is established containing all of the other published references. These concepts may represent one or more text-based references, such as patents and literature, sound data or video data. In one embodiment, the full text of a first published reference contained in the permanent database is extracted from the database along with identifying information. Then, multiple temporary databases are constructed containing at least identifying information for discrete separate references related to the first published reference where the contents of each of which has a different temporal relationship to the first published reference. Next, a multi-element morphogenetic icon is built for each of the discrete references stored in at least one of the temporary databases. This icon includes one element symbolizing the first published reference and a separate element associated with and representing each of the temporary databases. Finally, selected data for each of the discrete references is extracted from the permanent database and displayed along with the morphogenetic icon associated with that discrete reference. A primary object of the invention is to enable an n-dimensional relationship between concepts to be transformed and reduced to a two-dimensional representational icon. A further object of the invention is to enable anyone with access to the public Internet or a network connected to the system of the invention to access and view a morphogenetic icon which quickly provides in a visual format an easily understood representation of the conceptual relationship between a given reference and other references over a period which may begin before and extend until after the publication date of the given concept. Yet another object of the invention is to provide a user with a simple visual indicator concerning the likely degree of uniqueness and novelty of a subject concept. Still a further object of the invention is to provide a method for quickly analyzing the uniqueness of a subject concept in the context of a very large number of other references. An additional object of the invention is to provide a system for analyzing the uniqueness of a subject concept and for displaying the results of that analysis in an easily comprehensible form.

BRIEF DESCRIPTION OF THE DRAWINGS

The foregoing and other objects, aspects and advantages of the invention will be better understood from the following detailed description of the invention with reference to the drawings, in which:

FIG. 5 is a graphic illustration of a display of data and morphogenetic icons relating to four discrete patents representing the partial results of an analysis performed on a unique subject patent A.

DESCRIPTION OF THE PREFERRED EMBODIMENT OF THE INVENTION

Figure 1:
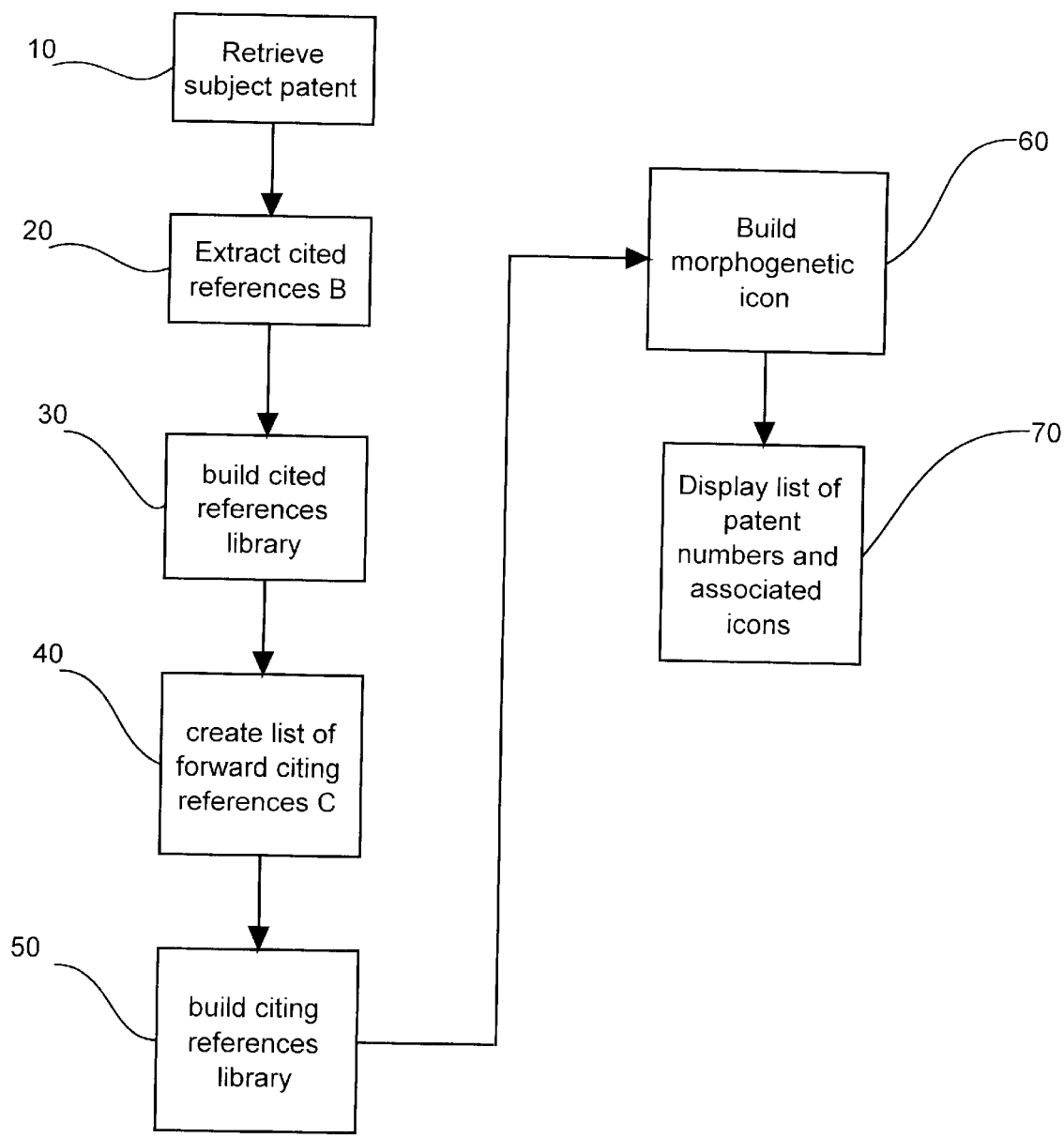
FIG. 1 is overview in block form of the process of this invention.

For a better understanding of the invention, reference is now made to FIG. 1 of the drawings. This figure presents an overview in block form of the process of this invention in its preferred embodiment in which the computer system of this invention in block 10 retrieves a requested subject patent A from a permanent database containing the full text of a large collection of issued patents the extent of which is defined by the system creator, as desired. This permanent database may also contain data concerning published but unissued patent applications and references cited against them in information disclosure statements or otherwise. The contents of the permanent database are periodically updated with newly published information. Furthermore, the method and system of this invention is not limited to use simply with patents issued in the United States. It can also be used with patents issued and pending in other countries throughout the world. In addition, it may also be extended to databases including literature which cite patents as well as to databases including concepts expressed in searchable text form and images, including multimedia formats such as, but not limited to, video and sound files so long as the data has been published and is also available in computer-accessible form. The term "reference", as used herein, refers both to a relationship between citations as determined by the U.S. Patent Office or by any other patent examining authority as well as to conceptual linkages between ideas as determined by semantic equivalents. The computer system then extracts from the data concerning subject patent A a list of patent references at block 20 which have been cited against subject patent A during patent prosecution storing them in a temporary database. Such references are referred to below as cited references B. Cited references B may include all art prior to subject patent A. Then, at block 30, for each of the cited references B, the computer reaccesses the permanent database and builds temporary databases containing references cited during patent prosecution against one or more of the cited references B and subsequent references which themselves cite one or more of the cited references B. Next, at block 40, the computer system reaccesses the permanent database and builds a list of patents to be stored in a temporary database against which subject patent A has been cited. Such references are referred to below as citing references C. Cited references C may include all art subsequent to subject patent A. Thereafter, for each of the citing references C, the computer reaccesses the permanent database at block 50 and builds temporary databases containing references cited during patent prosecution against one or more of the citing references C and subsequent references which themselves cite one or more of the citing references C. Finally, for each discrete patent cited in any of the temporary databases, the computer system builds and separately associates therewith at block 60 a unique icon representing the relationship between the discrete patent and the subject patent A in terms of the discrete patent's relationship to both cited references B and citing references C. This icon is termed a morphogenetic icon since its appearance describes the evolution of an idea over time prior to and subsequent to a common base concept, in this case subject patent A. At block 70, the computer system may display at the option of the user a list of all of the discrete patent numbers stored in all of the temporary databases together with their associated morphogenetic icon sorted based on any of a number of selectable fields. Each of these steps is explained in greater detail below.

Figure 2:
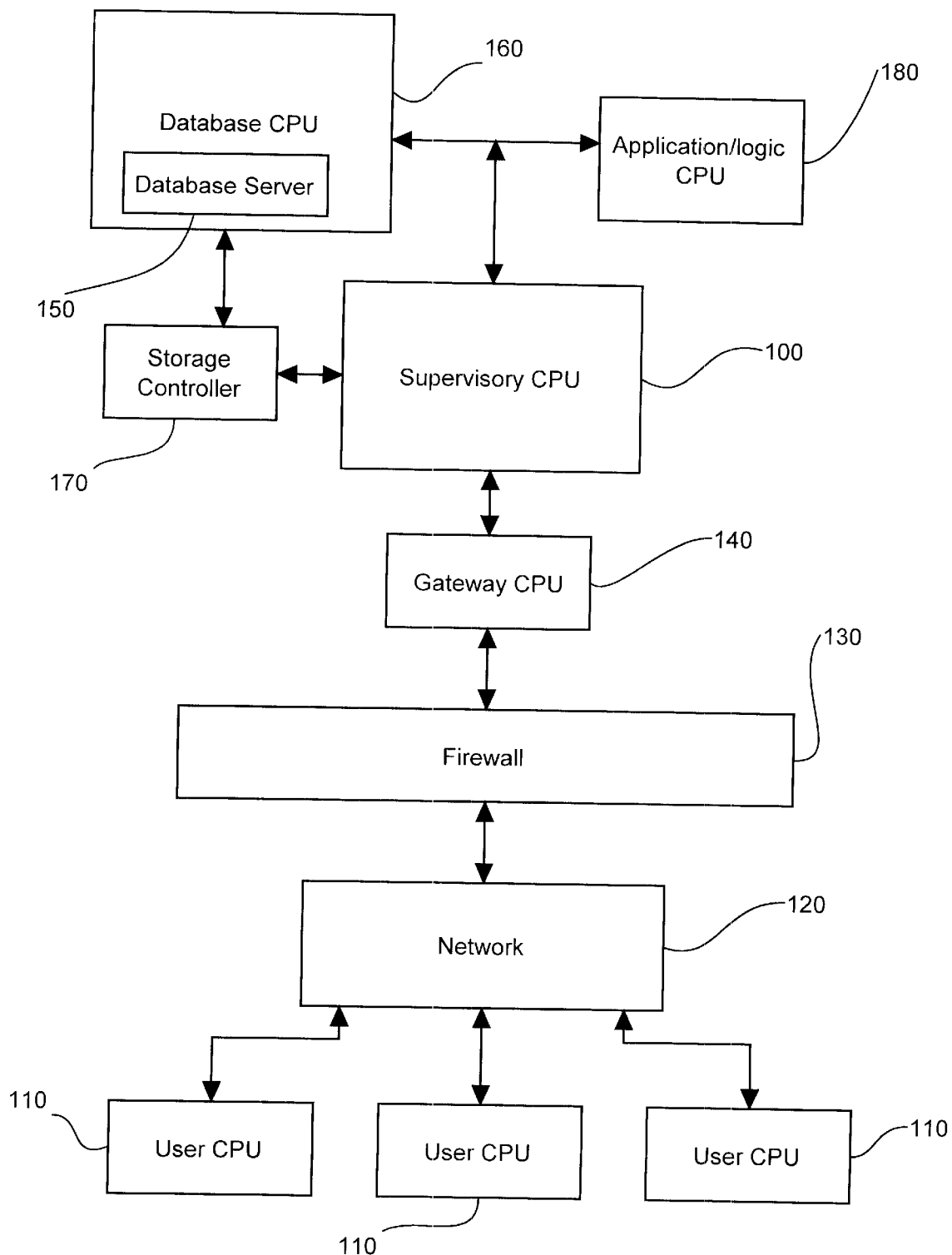
FIG. 2 is a block diagram of a hardware system for carrying out the data processing and operational methodology according to the preferred embodiment of the present invention.

The process of this invention is preferably performed by use of a computer system cooperating with one or more users who, by means of their input, control the specific data which is retrieved, generated and ultimately displayed by the computer system. A block form overview of the computer system of a preferred embodiment of the instant invention is shown in FIG. 2. This system may be implemented in the framework of a cooperative computer support network in which one or more users initiate certain actions and make sequential decisions using information that is presented to them after computer processing. The various components of the system are interconnected to each other via a supervisory central processing unit (CPU) 100 which may be any type of digital or other computing apparatus, such as a main frame or mini-computer. Supervisory CPU 100 coordinates, organizes and relays information to and from other components of the system as well as maintaining the proper functioning of the system. Each user CPU 110 may communicate with supervisory CPU 100 by means of a network 120 such as a LAN, WAN, MAN or over the public Internet, although other forms of connection are also possible. Each user CPU 110 includes a method, such as a keyboard, pointer and/or voice recognition means, for entry of data into a device which may be either a computer or a dumb terminal, as well as an electronic display device such as, but not limited to, a CRT or LCD monitor for displaying such input and any output transmitted to the particular user CPU 110 from Supervisory CPU 100 over the network. Each user CPU 110 may also include a printer or other output device for recording inputs to and outputs from user CPU 110 through the computer system of this invention. Also included for each user CPU 110 may be one or more devices for producing hardcopy documents, such as a printer. Supervisory CPU 100 is isolated and protected from network 120 by means of a firewall 130 which prevents and filters out unauthorized and undesired attempted communications with supervisory CPU 100 and by gateway CPU 140 which controls and manages appropriate and authorized communications with supervisory CPU 100. The permanent and temporary databases of this invention are maintained at database server 150 which may be a large capacity, high speed data storage device and which is typically physically located away from supervisory CPU 100 but within database CPU 160. Storage controller 170 controls access to database server 150 and maintains data and file system integrity. Application/logic CPU 180 sets the rules governing what specific data is retrieved from database server 150 while database CPU 160 executes instructions from the applications to retrieve data according to the rules set by application/logic CPU 180. The computer system may alternatively assume multiple configurations such that, for example, one or more CPU's singly or jointly perform all of the functions described above and multiple users may be simultaneously accommodated.

The process of this invention enables an n-dimensional relationship between patents, concepts and/or images to be transformed and reduced to a two-dimensional representational icon which can be viewed and used by anyone with a standard Internet browser, when Internet or like network transmission of information is used, and can, in any event, be easily used and understood by a nonexpert viewing the icon on a display device. In the preferred embodiment, the process of this invention creates and displays a separate morphogenetic icon for each patent in a list of patents representing patents which are related either directly or indirectly to a user-selected subject patent. As a result, a diagnostic or forensic tool is presented to a user for quickly and easily visualizing and understanding in a two-dimensional format the existence of relationships between ideas over a time continuum. Reference is now made to FIG.

3 which illustrates the data processing, storage and operational steps used in analyzing and assembling the data needed to create each morphogenetic icon. At block 200, a user enters one patent identifying number through user CPU 110 by means, for example, of manual keyboard entry.

Figure 3:
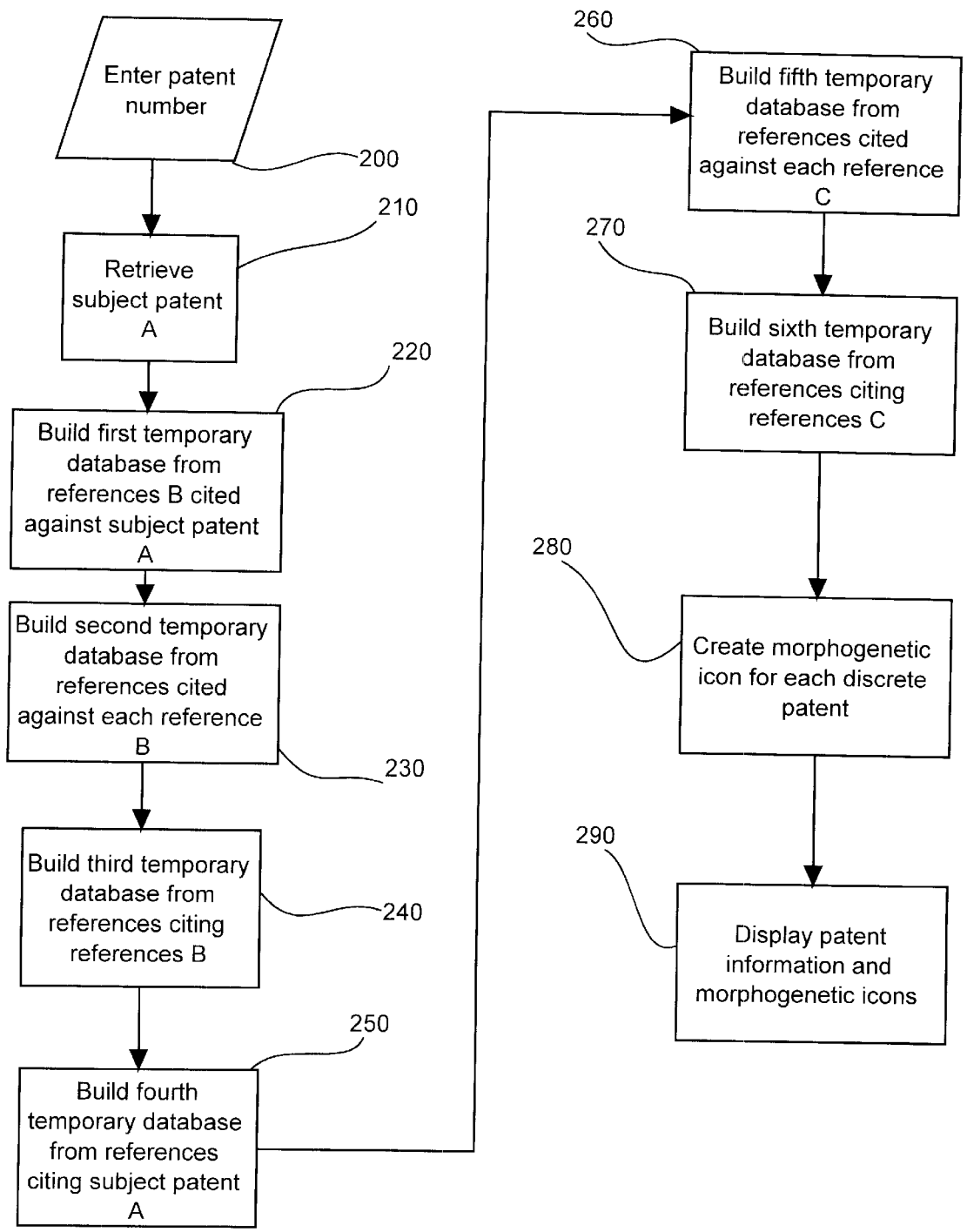
FIG. 3 is program flowchart depicting the data processing, storage and operational steps involved in assembling the information necessary to create the morphogenetic icon of the invention.

Alternatively, the system of this invention could be configured to permit entry of a plain language phrase or sentence, a non-patent literature identification number, an image or multimedia data as a basis for performing a search and building a morphogenetic icon. Assuming for purposes of FIG. 3 that only one patent number is entered and that user access to the computer system is authorized, this number becomes subject patent A and is successfully transmitted to supervisory CPU 100 over network 120 across firewall 130 and through gateway CPU 140. Supervisory CPU 100 then retrieves a full text copy of subject patent A from the permanent database maintained at database server 150 at block 210 and passes it to database CPU 160 where the appropriate field of the data record for subject patent A is accessed and a list of references cited against that patent during patent prosecution is extracted and stored in a first, temporary database at block 220. These references may be identified as cited references B. Then, for each cited reference B, database CPU 160 reaccesses the permanent database in block 230 and retrieves a list of patents which were cited during patent prosecution against the cited reference B. An aggregate list of such patent numbers is stored with database server 150 in a second temporary database. The issue dates of all patents on this list must, since they were cited by patents which were themselves cited against subject patent A, themselves predate the issue date of subject patent A. A third temporary database is created at block 240 when database CPU 160 reaccesses the permanent database and builds a list of patents representing those patents against which a cited reference B was cited during their own patent prosecution. The issue dates of patents in the third temporary database may either pre-date or post-date the issue date of subject patent A.

Attention is then turned specifically towards examination of patents related to patents issued after subject patent A. At block 250, database CPU 160 accesses the permanent database and builds a list of patents which include subject patent A as a reference cited against them during their patent prosecution. Such references are identified as citing references C. This is accomplished by accessing the permanent database to compare the patent number of subject patent A with patent numbers listed as having been cited against patents issued after subject patent A. Citing references C are stored with database server 150 in a fourth temporary database. A fifth temporary database is created at block 260 by database CPU 160 when it extracts from the permanent database a list of those patent which were cited against each of the citing references C. Patent numbers for these patents along with selected related data are stored in the fifth temporary database. The issue date of patents included in this fifth temporary database may or may not have an issue date pre-dating that of subject patent A. Finally a sixth temporary database is created at block 270 by database CPU 160 when it again reaccesses the permanent database to build a list of patents representing those patents against which a citing reference C was cited during their own patent prosecution. The issue dates of patents in the sixth temporary database may either pre-date or post-date that of subject patent A. The order in which the various temporary databases described above are created is not important so long as the relevant data is retrieved, stored and made available to the computer system. At this point, assembly of the data necessary to create the morphogenetic icons of this invention is complete. The process continues at block 280 where the computer system builds and separately associates with each of the discrete patents aggregately listed in the first, second, third, fourth, fifth and sixth temporary databases a morphogenetic icon unique to each such discrete patent. This icon is a symbolic representation of the relationship between each discrete patent and the subject patent A in terms of the discrete patent's relationship to both cited references B and citing references C as described below with regard to FIG. 4. Finally, at block 290 the computer system displays a list of patent numbers representing all of the unique patent numbers stored in an aggregate of the six temporary databases. Optionally at this point, the user may elect to display all discrete patents or only groupings of such patents which were issued either prior or subsequent to the subject patent. An identifying number for each of these patents is displayed together with its associated morphogenetic icon and selected further information from the patent record.

For each patent number stored in one of the temporary databases, selected data fields are extracted from the permanent database and stored. When displayed, all of the selected data fields may be identified in a row header appearing above the list of patent identifying numbers on the display page so that each data field appears above a column in which the relevant information for each patent is permanently associated with and presented in a row aligned with the respective patent identifying number. The selected data fields may include, but are not limited to, patent identifying number, assignee, patent classification code, patent term remaining until expiration, patent filing date and patent issue date. The patent numbers and associated rows of selected data fields may be sorted by any individually designated data field category in the header. The default sort field is by assignee although the default designation may be altered by the user. Fields for patent ratios and citation ratios are also associated with each patent number, but the contents of these fields varies depending on the key by which the data is sorted and displayed. A patent ratio is the ratio of the entry in one column of selected data for one patent when compared to the total number of patents in a morphogenetic set. Thus, when "assignee" is the selected column field, a ratio of 49/566 in a row relating to data concerning a patent owned by XYZ corporation would indicate that XYZ is the owner/assignee of 49 of the 566 patents in the morphogenetic set. However, a sort by "patent classification code" for the same patent where the patent ratio is 429/566 would mean that 429 of the 566 patents in the morphogenetic set were classified in the classification code associated with the patent number. A citation ratio counts the total number of citation relationships (i.e., the total number of elements of morphogenetic icons filled in on all of the patents) and then creates a parallel index using the sort column as the numerator within the ratio. A citation, in this system, occurs any time any one patent provides a reference to another patent. In the morphogenetic set, the total number of citations for all the patents involved in the set is counted. The citation ratio is derived by looking at a set of patents sorted either by Assignee or Classification Code in the set and comparing it to the number found out of the entire set. Thus, for example, if a citation ratio of 306/1898 were displayed in a row resulting from a sort based on assignees and the assignee were listed as IBM Corp., it would mean that patents assigned to IBM represent 306 out of the 1898 total citations in the particular morphogenetic set. However, since it is possible for there to be more citations than patents in a morphogenetic set since there may be more than one patent in the set that cites the same patent, the patent and citation ratios in an individually displayed row of data for one patent may have different numerators.

Theoretically, an unlimited number of patent identifying numbers may be entered by the user at block 200 without changing the basic procedure described below other than causing reiterative performance of the steps described for each patent identifying number entered. As a practical matter, however, a maximum of five patent numbers may be entered since, otherwise, an excessive number of references are likely to be identified meeting the criteria necessary for storage in the various temporary databases thereby reducing the practical advantages obtained through use of this system and practice of this method. In cases where multiple patent identifying numbers are entered at block 200, the computer system will combine all of the information relating to the entered patent numbers to build a hypothetical single subject patent A for which the steps described above are then executed.

Figure 4:
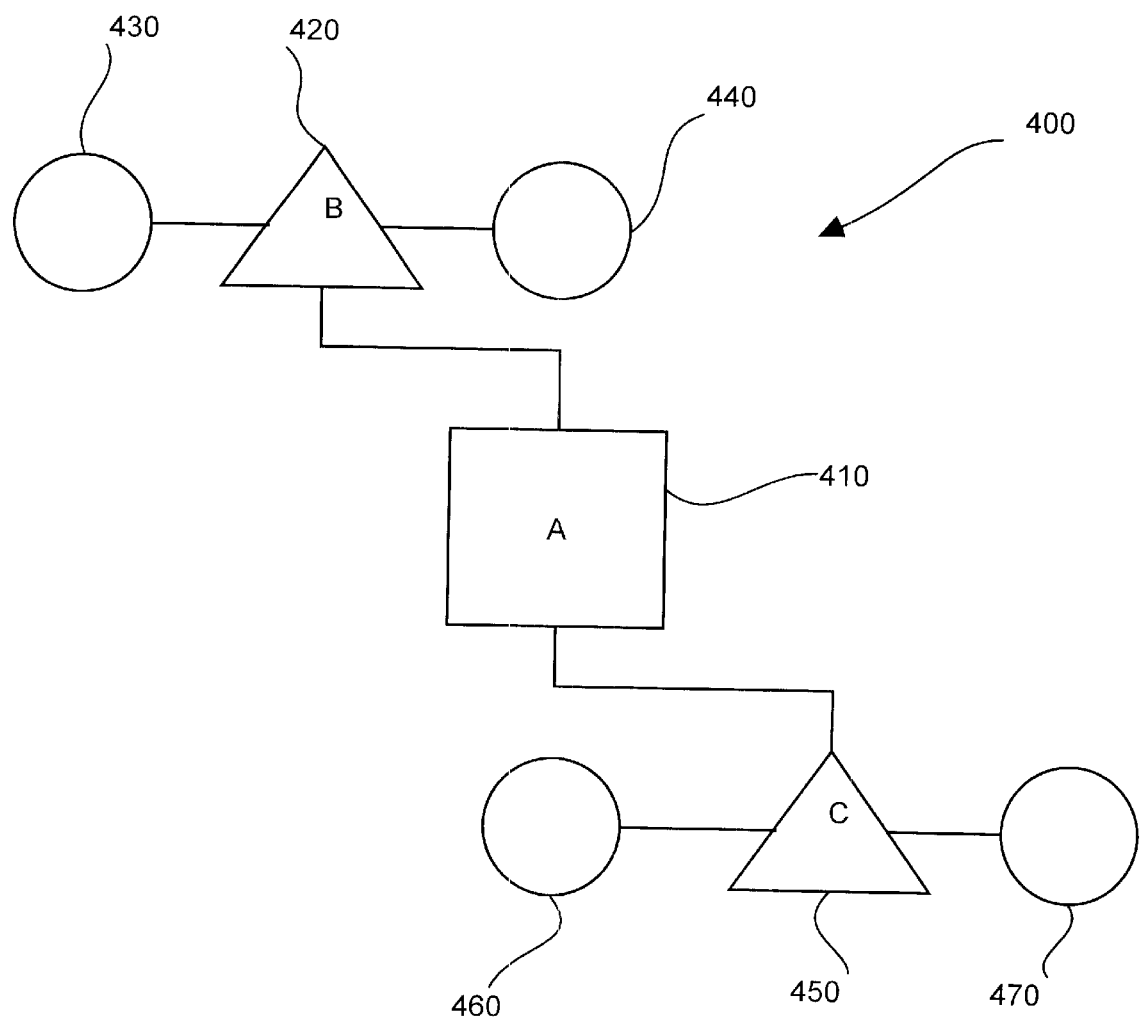
FIG. 4 is graphic depiction of a non-activated, generic form of the morphogenetic icon of the invention.

In order to understand the importance and usefulness of the morphogenetic icon, its component parts must be identified and explained. Reference is now made to FIG. 4 which depicts a non-activated, generic morphogenetic icon 400 comprised in the preferred embodiment of a central square, two triangles and four circles although other geometric figures designs or shapes may be substituted therefor. In the preferred embodiment, each separate geometric figure is referred to as an element. When a discrete patent identifying number is displayed to a user in a row along with the associated selected data fields including unique icon 400 and a particular element in icon 400 is shaded, that means that the discrete patent appears in the temporary database associated with that element. Thus, a relationship exists between the discrete patent and subject patent A according to the criteria described below for each element. Central square 410 represents the subject patent A which is the patent number which was entered by the user at block 200. Upper triangle 420 represents patents cited against subject patent A. Such patents were identified above as cited references B and are stored in the first temporary database as described in relation to block 220. Upper triangle 420 represents a prior generation of patents directly related to subject patent A. Upper left circle 430 represents patents cited during patent prosecution against any cited reference B. Such patents are part of the second temporary database described in relation to block 230. Upper left circle 430 represents a prior generation of patents indirectly related to subject patent A. Upper right circle 440 represents patents against which one or more cited references B was cited during their respective patent prosecutions. Such patents are part of the third temporary database described in relation to block 240. Upper right circle 440 represents a generation of patents indirectly related to subject patent A which may have been issued prior to or subsequent to subject patent A. Lower triangle 450 represents patents against which subject patent A was cited during their respective patent prosecutions. Such patents were identified above as citing references C and are stored in the fourth temporary database described in relation to block 250. Lower triangle 450 represents a subsequent generation of patents directly related to subject patent A. Lower left circle 460 represents patents cited during patent prosecution against any citing reference C. Such patents are part of the fifth temporary database described in relation to block 260. Lower left circle 460 represents a generation of patents indirectly related to subject patent A which may have been issued prior to or subsequent to subject patent A. Lower right circle 470 represents patents against which one or more citing reference C was cited during their respective patent prosecutions. Such patents are part of the sixth temporary database described in relation to block 270. Lower right circle 470 represents a subsequent generation of patents indirectly related to subject patent A.

Aside from central square 410, the contents of which will always appear as a white, unshaded square signifying no other patent is subject patent A, the other elements may appear either with a white background, if no patent appears in the temporary database associated with that element, or, along with all lines interconnecting all elements of the icon, in one of a selection of colors which may be coded according to Table 1 below to indicate the number of different relationships that the listed patent has with subject patent

TABLE 1

| # of Relationships | Color |
|---|---|
| 1 | black |
| 2 | red |
| 3 | dark blue |
| 4 | green |
| 5 | orange |
| 6 or more | light blue |

In other words, for example, a single discrete patent may have been cited during patent prosecution against one or more patents which were themselves cited against a patent (a cited reference B) which was cited against subject patent A. If none of the criteria related to the other elements in the icon were fulfilled, upper circle 430 would be filled in black in the morphogenetic icon displayed together with the single discrete patent at block 310 as would be all of the remaining lines constituting the icon. If, on the other hand, criteria related to upper circle 440 and lower circle 460 were met, then all of these circles would be filled in with a dark blue color, and all of the lines outlining and interconnecting the other elements of the icon would similarly appear in blue. This configuration would indicate that there are three different dimensional planes of relationship between the discrete patent and subject patent A. Of course, other colors can be designated at the option of a user to represent any particular relationship. Additionally, icons of particular significance may be further delineated by the addition of graphic indicators such as a square or dotted line around the entire icon.

More elements may be added to morphogenetic icon 400 to indicate the results of research into still other conceptual relationships. For example, diagonal lines terminating in circles to the upper right and lower left of upper left circle 430 may be added to reflect the results of examination of the relationship between a discrete patent and the patents cited by and citing those patents represented by a shading of upper left circle 430. However, such additional data may prove of limited value and may actually decrease the efficiency of the diagnostic and forensic capabilities otherwise represented by use of the morphogenetic icon in the basic form of FIG. 4. In addition, the sizes of the elements may be increased or decreased in size in a manner corresponding to the number of discrete references contained in the temporary database associated with that element.

FIG. 5 represents a partial, incomplete illustrative display of four rows of data presented with row headers resulting from the creation of a morphogenetic set based on a search of U.S. Pat. No. 5,487,682 using the color key presented above in Table 1. The user is aware of data relevant to '682, such as the classification, issue dates and cited references of subject patent '682, since this patent was selected by the user to be subject patent A for purposes of creation of the morphogenetic set. Examination of the morphogenetic icon associated with each of the four listed patents demonstrates the utility of the method and system of this invention. In the following discussion, the elements of the icon are identified by number corresponding to the discussion of FIG. 4 The morphogenetic icon associated with U.S. Pat. No. 4,186,984 indicates that upper left circle 430 is filled in black while all other elements of the set are unshaded and interconnected by black lines. Thus, there is only one relationship between '682 and '984. Specifically, '984 was prior art cited by one or more of the patents cited by '682. Exactly which patents cited '984 can be ascertained by individual retrieval and examination of the patents cited by '682. It may or may not be particularly noteworthy that triangle 420 is unshaded, i.e. that '682 did not itself cite '984 as prior art, since innovation often builds off of earlier cited art. The morphogenetic icon associated with U.S. Pat. No. 4,508,415 shows that lower left circle 460 is shaded black while all other elements of the set are unshaded and interconnected by black lines. This icon again indicates that '415 shares only one citation relationship with '682, i.e. that a patent which cited '682 also cited '415. Thus, an examiner concluded that both '682 and '415 were important prior art in relation to examination of a particular patent. A list of patents citing '682 could be quickly accessed from the permanent database of the invention in order to determine which citing reference also cited '415. The icon representing the morphogenetic set associated with '415 does not indicate a high likelihood of particular relevance to the subject matter of '682, but by selecting '415 with an input device such as a mouse the patent can be retrieved an a quick check made to determine if further review is warranted. The morphogenetic icon associated with U.S. Pat. No. 4,582,376, however, warrants closer attention. In this morphogenetic icon, upper right circle 440 and lower left circle 460 are both filled in red while all other elements in the icon are unshaded but outlined and interconnected by red lines. In this example, red shading indicates the existence of two citation relationships to '682. The greater the number of citation relationships, the higher the probability, though not certainty, that a patent around which a morphogenetic icon was created warrants closer inspection. Filling of upper right circle 440 indicates that '376 cited as prior art, one of the patents that '682 cited as prior art, while the filling of bottom left circle 460 indicates that a patent which cited '682 as prior art also cited '376 as prior art. The configuration of this icon would lead a user to question why two different patents saw a relationship to patents that are linked directly to '682 through both prior and subsequent art while '682 itself has no direct relationship to '376. The user would likely access '376 through the permanent database to determine what degree of further analysis of '376 was necessary. The assignee can also be used in conjunction with the morphogenetic icon to determine if there is a corporate or competitive reason to suspect that a particular morphogenetic icon results from deliberate efforts to design around an existing patent. In a like fashion, the classification code would also indicate whether or not one skilled in the art should have been able to find a particular patent. Finally, the morphogenetic icon associated with U.S. Pat. No. 4,682,836 would raise a high level of concern in the user. In this case, upper left circle 430, upper right circle 440 and lower left circle 460 are filled in blue, while the remainder of the elements in the icon are outlined in and interconnected with blue lines. Since upper left triangle 420 is unfilled, the examiner must have concluded that '836 was not relevant prior art as to the claims of subject patent '682 despite the fact that '682 shares a common classification with '836. The date of issuance of '682 indicates that '836 was known at the time that '682 was filed. The state of upper left circle 430 indicates that '836 was believed to be relevant prior art to a patent cited by the examiner against subject patent '682. The state of upper right circle 440 indicates that '836 cited as prior art a patent, also cited as prior art by '682. The state of lower left circle 460 indicates that '836 was cited as prior art by a patent also citing '682 as prior art. Thus, on at least three different occasions, the relationship of '836 was judged to be relevant in the universe in which '682 claimed to have unique and novel claims. Again, this does not in and of itself indicate overlap or invalidity of '682, but it does increase the need to make a side-by-side actual comparison of the disclosure and claims of '836 and '682. Although this is not displayed in FIG. 5, the fact a full display of the morphogenetic set generated by '682 has eleven dark blue icons would appear to be a further indicator of potential problems, since the number of times such icons appear within a morphogenetic set is itself an indicator of the existence of art potentially anticipatory of a subject patent such as '682.

The method and system of this invention enable the user to immediately view and understand the relationship between a subject patent and any other patent in a morphogenetic set comprised of all specified patents in the aggregate of temporary databases created by the system during examination of a particular subject patent A. The advantages of generating morphogenetic icons derived from a subject patent become immediately apparent when using the system. Since the morphogenetic icon displays interrelationships of concepts as determined by the Patent Office, when information is organized, sorted and displayed at block 310 by field, such as patent classification number associated with patents in the set, instant identification of what other parties are active in the same intellectual property areas as those dealt with by the subject patent is possible. Similarly, information may be organized, sorted and displayed at block 310 by patent assignee which enables the user to determine by examination of associated morphogenetic icon which assignees pose a potential competitive threat to the patentable material disclosed in the subject patent A. This method of identification takes significantly less time and effort than either a manual or a computer search accompanied by separate examination of all patents associated with specific assignees or classification numbers. As a result, both otherwise overlooked licensing opportunities and unknown competitive threats may be identified. Additionally, generation of morphogenetic icons can significantly improve the speed, accuracy and thoroughness of prior art, interference, infringement and validity analyses. Furthermore, a relatively unskilled, and hence less costly, person can quickly become familiar with the meanings of different configurations of morphogenetic icons and can, therefore, make threshold level determinations by simply viewing the various icons and applying simple logic before referring the matter to a higher level for a more experienced person for review and final action. Moreover, examination of the state of morphogenetic icons in a morphogenetic set enables a user to identify concurrent art which, for purposes of the preferred embodiment, is defined as all patents that were in examination but not yet issued between the date when the subject patent A was filed and the subject patent A was issued. The concurrent art concept would also apply to alternative embodiments of the invention involving databases including literature, concepts searchable in text form, images and multimedia formats. Finally, by examining morphogenetic icons the ability of engineers to safely and successfully design around existing patents is enhanced. Other advantages include more rapid identification of potential new business applications for existing patents, rapid identification of a more comprehensive list of potential licensees of existing technologies, more rapid identification of potential problems including claims overlap, invalidity, prior art uncited because of filing in an unanticipated, or off-axis, classification code, and identification of a more comprehensive and accurate list of related properties from which to initiate any of the above mentioned analyses.

The foregoing invention has been described in terms of the preferred embodiment. However, it will be apparent to those skilled in the art that various modifications and variations can be made to the disclosed method and system without departing from the scope or spirit of the invention. The specification and examples are exemplary only, while the true scope of the invention is defined by the following claims.

What is claimed is:

1. A computer-based method for determining and visually representing in easily comprehensible form the uniqueness and novelty of at least one subject concept, which has been published in one or more first references on a first publication date, as compared over time to other concepts each of which was published on a specific date in one or more references by generating and displaying an icon representing multitemporal and multidimensional data relationships between the one concept and relevant ones of the other concepts comprising the steps of:

establishing a permanent database containing the full text and identifying data for all references for which a comparison is desired;

extracting a first reference embodying the one concept and having a first publication date;

building and storing a multiplicity of temporary databases each of which contains at least identifying information regarding references conceptually related to the subject concept wherein the references stored in each of which have a different temporal relationship to the subject concept;

generating a multi-element morphogenetic icon for each discrete reference contained in each of said temporary databases wherein each said morphogenetic icon has one element representing the subject concept and a separate element associated with and representing each of said temporary databases;

extracting from said permanent database selected data for each discrete reference contained in each of said temporary databases; and displaying for each discrete reference said morphogenetic icon together with said selected data.

2. A computer-based method for reducing an n-dimensional relationship between ideas disclosed in a user-chosen subject patent reference and ideas disclosed in other related patent references selected from among all those patent references stored in a permanent database to a set of two-dimensional representational icons one of which is associated with each related patent reference and displaying that set of two-dimensional representational icons in a user-chosen order comprising the steps of:

establishing a permanent database containing the full text of and identifying information associated with all references desired to be included therein;

retrieving the full text and identifying information of the subject patent reference;

identifying patent references cited against the subject patent reference during patent prosecution and storing at least the identifying number of each such cited patent reference in a first temporary database;

identifying patent references cited against the patent references cited against the subject patent reference during patent prosecution and storing at least the identifying number of each such cited patent reference in a second temporary database;

identifying patent references citing each of the references cited against the patent references cited against the subject patent reference during patent prosecution and storing at least the identifying number of each such citing patent reference in a third temporary database;

identifying patent references citing the subject patent reference during patent prosecution and storing at least the identifying number of each such citing patent reference in a fourth temporary database;

identifying patent references cited against the patent references citing the subject patent reference during patent prosecution and storing at least the identifying number of each such cited patent reference in a fifth temporary database;

identifying patent references citing each of the references cited against the patent references citing the subject patent reference during patent prosecution and storing at least the identifying number of each such citing patent reference in a sixth temporary database;

for each discrete patent reference stored in at least one of the temporary databases, building and associating therewith a two-dimensional, multi-element icon of the relationships between that discrete patent reference and the subject matter reference as defined by the temporary databases in which:

the subject matter reference is represented by the outline of a central element;

the first temporary database is represented by the outline of a first element located above and displaced to the left of the central element which is connected thereto by a line and wherein the outline of the first element is filled in if the discrete patent reference appears in the first temporary database;

the second temporary database is represented by the outline of a second element located horizontally parallel with and displaced to the left of the first element which is connected thereto by a line and wherein the outline of the second element is filled in if the discrete patent reference appears in the second temporary database;

the third temporary database is represented by the outline of a third element located horizontally parallel with and displaced to the right of the first element which is connected thereto by a line and wherein the outline of the third element is filled in if the discrete patent reference appears in the third temporary database;

the fourth temporary database is represented by the outline of a fourth element located below and displaced to the right of the central element which is connected thereto by a line and wherein the outline of the fourth element is filled in if the discrete patent reference appears in the fourth temporary database;

the fifth temporary database is represented by the outline of a fifth element located horizontally parallel with and displaced to the left of the fourth element which is connected thereto by a line and wherein the outline of the fifth element is filled in if the discrete patent reference appears in the fifth temporary database;

the sixth temporary database is represented by the outline of a sixth element located horizontally parallel with and displaced to the right of the fourth element which is connected thereto by a line and wherein the outline of the sixth element is filled in if the discrete patent reference appears in the sixth temporary database;

retrieving from said permanent database the identifying information associated with each of the discrete patent references; and for each discrete patent reference stored in a temporary database, displaying said identifying information and said associated icon in the user-chosen order.

3. The method of claim 2 wherein the lines and elements, whether filled or unfilled, of each said icon are displayed in a single color corresponding to a table wherein each color represents the number of different temporary databases in which the discrete patent reference appears.

4. The method of claim 2 wherein the user may chose to create one or more additional temporary databases containing data relating to patent references cited by or citing references contained as a source in any of said first, second, third, fourth, fifth or sixth temporary databases and wherein such additional temporary databases are represented by additional elements added to said multi-element icon appearing as connected to the element representing the respective source temporary database, such additional elements being represented in outlined or filled-in form in association with a discrete reference depending on whether the discrete patent reference appears in the additional temporary database.

5. The method of claim 2 wherein the icon elements are geometric forms.

6. The method of claim 2 wherein the icon elements may vary in size so that the element becomes larger when there is a greater number of discrete patent references in the temporary database representative of that icon element.

* * * * *